United States Patent [19]
Snitgen

[11] 3,882,761
[45] May 13, 1975

[54] FLUID STOP MECHANISM

[76] Inventor: Joseph D. Snitgen, 18828 Hillcrest, Birmingham, Mich.

[22] Filed: Nov. 14, 1973

[21] Appl. No.: 415,815

[52] U.S. Cl. .......................... 92/29; 60/583; 92/84; 92/86
[51] Int. Cl. .............................. F01b 9/00
[58] Field of Search ........ 92/20, 29, 84, 86; 60/547, 60/583, 593

[56] References Cited
UNITED STATES PATENTS

| | | | |
|---|---|---|---|
| 941,731 | 11/1909 | Scott | 92/84 X |
| 1,892,335 | 12/1932 | Engel | 92/84 X |
| 2,711,632 | 6/1955 | Ellis | 92/84 X |
| 2,851,994 | 9/1958 | Fagge | 92/84 X |
| 2,938,996 | 5/1960 | Carswell | 92/84 X |
| 2,944,525 | 7/1960 | Fagge | 92/84 X |
| 2,976,845 | 3/1971 | Goldring | 60/583 X |
| 2,982,257 | 5/1961 | Fagge | 92/84 X |
| 3,012,404 | 12/1961 | Wilkenloh et al. | 92/84 X |
| 3,410,182 | 11/1968 | Snitgen | 92/13 |
| 3,426,530 | 2/1969 | Georgelin | 60/583 X |

Primary Examiner—Irwin C. Cohen
Assistant Examiner—Abraham Hershkovitz
Attorney, Agent, or Firm—Harness, Dickey & Pierce

[57] ABSTRACT

A fluid stop mechanism comprising a fluid motor having a driven member and a stop member that is adapted to engage a workpiece or the like and exert very low force against the workpiece upon contact, but which develops a substantial force in resistance of any tendency for the workpiece to move. The stop member forms a piston in a variable volume fluid chamber in which an incompressible fluid is contained. A port extends from this chamber which is adapted to be closed when the stop member engages a workpiece or the like to provide a hydraulic lock in this fluid chamber. This hydraulic lock precludes any tendency for the stop member to undergo any reverse movement. An internal reservoir is provided to supply and receive all the fluid which may be displaced into or out of the fluid chamber to obviate the need for bleeding the mechanism in certain situations.

11 Claims, 2 Drawing Figures

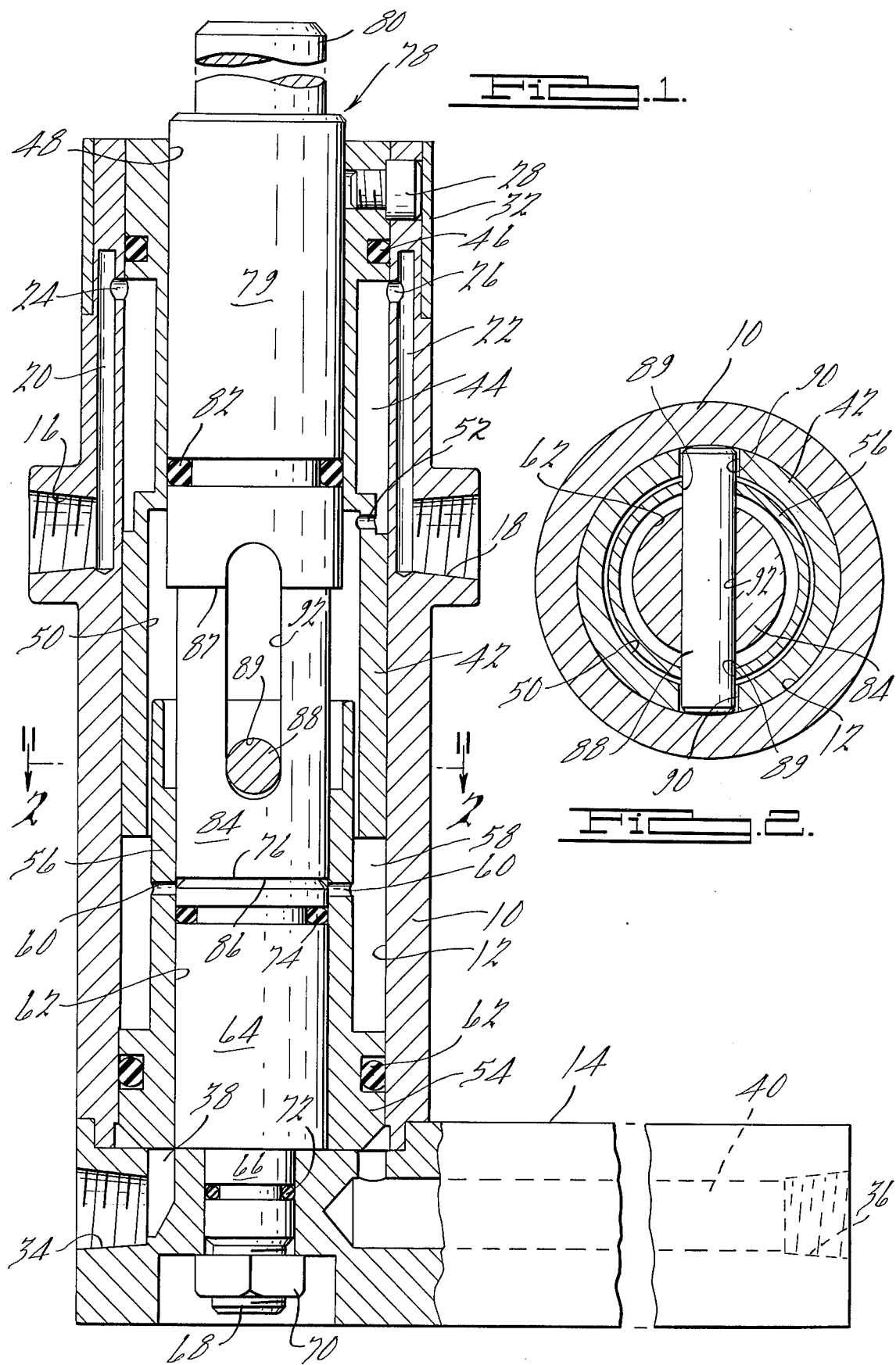

FLUID STOP MECHANISM

BACKGROUND OF THE INVENTION

This invention relates to a fluid stop mechanism and more particularly to an automatically adjustable fluid stop for contacting and holding workpieces or the like. The invention constitutes an improvement upon the stop mechanism disclosed in U.S. Letters Pat. No. 3,410,182.

In many instances it is desirable to provide a stop mechanism that will automatically move into contact with a workpiece or the like without exerting any more than a relatively low force against it, but will nevertheless substantially preclude movement of the workpiece towards the stop when substantially greater forces are exerted on the workpiece by some other means. Examples of the use of such stops are as backups in production spot welding equipment, as locating supports for parts positioned in machining or assembly fixtures, and so forth. One difficulty that has been encountered on occasion on known units, such as that disclosed in the aforesaid patent, is that when it becomes necessary to replace hydraulic hoses leading to the mechanism such hoses are generally devoid of oil when installed. Consequently, if the stop mechanism is in an extended position at the time of hose replacement, when the mechanism is retracted air is drawn or forced into the unit and because air is compressible the mechanism may not function properly for the first several cycles. To correct or avoid this problem it is often necessary to cycle the mechanism a number of times to bleed out all of the air and/or to precharge the hose with hydraulic fluid prior to installation.

It is therefore a principle object of this invention to provide an improved stop mechanism which exerts a relatively low force upon a workpiece unless the workpiece is urged against the stop, and which avoids the aforementioned disadvantages of known mechanisms. A related object concerns the provision of such an improved stop mechanism which is relatively simple in construction and which is wholly disposed within a unitary housing so that no external components are required for its operation other than a source of fluid under pressure and a tank into which to dump return fluid.

Another object of the present invention resides in the provision of an automatically adjustable fluid stop mechanism which displaces a smaller amount of fluid for a given stroke than the mechanism disclosed in the aforesaid patent, thereby reducing the load on the main hydraulic supply pump and also making it possible to provide a fully internal oil supply for the mechanism to thereby obviate the need for bleeding the system after replacement of hoses or the like.

These and other objects, features and advantages of the present invention will become apparent from the subsequent description and the appended claims, taken in conjunction with the accompanying drawing.

BRIEF DESCRIPTION OF THE DRAWINGS

FIG. 1 is a longitudinal cross-sectional view of a fluid stop mechanism embodying the principles of the present invention; and FIG. 2 is a cross-sectional view taken along line 2—2 in FIG. 1.

DETAILED DESCRIPTION OF THE PREFERRED EMBODIMENT

The preferred embodiment of the present invention illustrated in FIGS. 1 and 2 generally comprises a cylindrical housing 10 having a bore 12 therethrough and a base assembly 14 affixed to the lower end thereof. Housing 10 is provided with a pair of tapped return ports 16 and 18 communicating respectively with passageways 20 and 22 disposed longitudinally within the wall of the housing. Passageways 20 and 22 in turn communicate with bore 12 by means of radial passageways 24 and 26 respectively.

Base assembly 14 is rigidly secured to housing 10 by means of brazing, welding or the like and comprises tapped supply ports 34 and 36 communicating via passageways 38 and 40, respectively, with the open inner end of bore 12. Base assembly 14 may also be provided with suitable tapped holes or the like to provide appropriate means for mounting the mechanism within a fixture or where ever desired.

Rigidly affixed within bore 12 of housing 10, as by a screw or the like 28, is a sleeve 42 defining at its outer end an annular reservoir chamber 44 in fluid communication with passageways 24 and 26. The outer free end of housing 10 may be provided with a collar 32 or the like for covering and locking in place screw 28. O-ring sealing means 46 is provided to seal the outer end of bore 12. Sleeve 42 has a smaller diameter bore 48 adjacent the outer end thereof and a larger diameter bore 50 adjacent the inner end thereof, and an orifice 52 is provided between annular chamber 44 and bore 50.

Slidingly disposed within the inner end of bore 12 is a fluid motor comprising an annular piston 54 having a longitudinally outwardly extending sleeve portion 56 defining an annular space 58 between the outer surface thereof and the wall of bore 12. Sufficient clearance is provided between the outside of sleeve portion 56 and the inside surface of bore 50 to permit the flow of fluid therebetween. Intermediate the length of sleeve portion 56 there are provided a pair of radially extending passageways 60, and adjacent the inner end of annular piston 54 is disposed O-ring sealing means 62. Annular piston 54 has a longitudinally extending bore 62 in which is disposed a cylindrical projection 64 rigidly affixed to the mechanism by means of a boss 66 which projects through base assembly 14 and has an outer threaded end 68 to which is threadably secured a nut 70. O-ring sealing means 72 is provided to prevent the leakage of fluid along the boss 66. Further O-ring sealing means 74 is provided about projection 64 to seal the same with respect to bore 62. The free end of projection 64 indicated at 76, is so located with respect to sleeve portion 56 that when the annular piston 54 is in its fully retracted position, as illustrated, passageways 60 will be in alignment and fluid communication with surface 76 and the chamber defined thereby.

Slidingly disposed within bore 50 of sleeve 42 is longitudinally extending stop member 78 having a main body portion 79, an outer end portion 80 adapted to engage a workpiece or the like, O-ring sealing means 82 for sealing the stop member with respect to bore 48, a reduced diameter portion 84 having an end surface 86 abutting surface 76 of projection 64 when the mechanism is in the position shown in FIG. 1, and an annular shoulder 87 separating portions 79 and 84.

Annular piston 54 and stop member 78 are connected together by means of a lost motion connection comprising a pin 88 disposed within opposing complementary openings 89 in sleeve portion 56 and extending through a longitudinally extending slot 92 in stop member portion 84. The free ends of pin 88 are slidingly disposed in slots 90 in sleeve portion 42 to prevent rotation of the stop member, a very desirable feature in welding applications. Slots 90 and 92 should be of sufficient length to permit piston 54 to move a full stroke, regardless of the distance between stop member portion 80 and the workpiece. As best seen in FIG. 2, pin 88 is of a length less than the inside diameter of bore 12 but is greater than the inside diameter of sleeve 42 by an amount sufficient to insure that it will always remain in place in slots 90. Slot 92 is positioned so that when the mechanism is in the position illustrated in FIG. 1, pin 88 is at or close to the inner end thereof.

The stop mechanism may be used in any of a number of different applications wherein stop member portion 80 is desired to engage a workpiece with relatively low force but is effective in precluding movement of the workpiece in at least one direction. As an example of such an application, the stop mechanism may be used as a back-up cylinder in a spot welding fixture, or in conjunction with a back-up die of a press, or in like manner. It is to be understood that these uses are merely exemplary and that various other uses for this device will present themselves to those skilled in the art.

FIG. 1 illustrates the device in its retracted position. To extend the stop member into engagement with a respective workpiece, fluid (preferably an incompressible liquid such as hydraulic fluid, oil, or the like) is admitted under pressure against annular piston 54 through either port 34 or 36, depending upon which supply port is being used. The port not used should be plugged. The fluid may be introduced from any known fluid source through a conventional four-way valve and ports 16 and 18 are simultaneously vented to tank in the usual manner. Upon the application of hydraulic pressure, piston 54 will move upwardly driving fluid from the chamber 58 and out port 16 and/or 18, via orifice 52, reservoir 44, passageway 24 and/or 26 and passageways 20 and 22. Since end surface 86 and shoulder 87 of stop member 78 are subjected to the fluid back pressure caused by orifice 52, piston 54 and stop member 78 will move upwardly in unison. The interaction of pin 88 with the inner end of slot 92 prevents stop member 78 from moving ahead of piston 54 and making it more difficult to control workpiece engagement. It also prevents stop member 78 from being forced out of the mechanism. During this movement stop member surface 86 will move away from surface 76 of projection 64, thereby creating a fluid locking chamber of increasing volume therebetween. As it expands, this locking chamber will draw fluid through passageways 60 from chamber 58.

The movement of stop member 78 in unison with piston 54 will continue until the stop member contacts the workpiece. When this occurs piston 54 will begin to move upwardly relative to the stop member 78 and passageways 60 will be closed to hydraulically lock fluid in the locking chamber between surfaces 76 and 86. Piston 54 will continue its upward movement until the outer end of portion 56 abuttingly engages the annular shoulder between sleeve member bore portions 48 and 50. Because of the lapped fit between portion 84 and bore 62 (as distinguished from an O-ring seal which necessarily must be spaced inwardly from the end) only a minimum degree of relative movement between the piston and stop member is required in order to fully close passageways 60 and fluid lock the stop member in place. This also serves to reduce the stroke of piston 54 for a given stop member stroke capacity.

The force stop member 78 exerts upon the workpiece will be only the force caused by the back pressure created by orifice 50 acting on the inner end of the stop member and shoulder 87, and may be varied by varying the diameter of orifice 52 or by using a flow control valve for the flow through ports 16 and 18. If the workpiece, however, tends to move in a direction which corresponds to return movement of the stop member, such movement will be precluded by the incompressible fluid contained within the aforesaid locking chamber or cavity. Hence, an extremely high force will resist any tendency for the workpiece to move the stop member in a return direction.

In order to release the stop member, the control valve for the supply fluid is reversed and fluid is admitted under pressure through either return port 16 or 18, depending on which one is used. The port not used should be plugged. The appropriate port 34 or 36 is vented to tank and piston 54 will then be driven downwardly, as shown. During the initial movement of the piston the stop member will remain fluid locked in position, however, after the piston has moved enough to bring passageways 60 into alignment with surface 86 and thereby remove the fluid lock, pin 88 will engage the end of slot 92 and cause stop member 78 to be retracted along with the piston 54.

One of the primary features of the present invention is the provision of a fully internal reservoir for hydraulic fluid which in the embodiment disclosed is created by annular chamber 44. As can be seen, this reservoir is disposed wholly within the main housing of the mechanism. The reservoir is preferably of a volume at least equal to the maximum volume of fluid which can be displaced out of the mechanism when the stop mechanism is in an extended or advanced position, and in practice it has been found that a volume of two to four times as great as the aforesaid maximum volume provides extremely good results insofar as obviating the need for bleeding the system when hoses are replaced, and the like. This problem normally arises when the stop mechanism is located above the source of hydraulic fluid (if below the hose will automatically fill with oil and/or any air will collect at the opposite end from the stop mechanism) and when the hose is replaced while the stop mechanism is in a condition in which the stop member is extended. When the stop member is in its advanced or extended position in the absence of a reservoir almost all of the oil above annular piston 54 is exhausted into the return line leading to the source of hydraulic fluid. Consequently, if such a line is replaced with one containing air, when pressure is applied thereto the air will be forced into the mechanism. Since air is compressible and since the locking function requires the use of an incompressible fluid, the mechanism will not function properly until the air is removed.

In the present invention, however, with the provision of annular chamber 44 as a reservoir having a volume at least as great as that of the maximum amount of fluid displacable from the mechanism, this air problem is obviated. If a hose is replaced by one having air in it, when the air filled hose is pressurized to retract the unit the fluid pressure, whether due to air or liquid, operates to force the liquid out of reservoir 44 into the main part of the mechanism to retract the stop member in the normal manner and thereafter permit locking in the desired manner. Since the volume of reservoir 44 is greater than the volume of displaced fluid, the reservoir will not by fully depleted of liquid. Any air that might get in the reservoir has not been found to be a problem because after several cycles of normal operation of the mechanism this air will work itself out of the system. Locating orifice 52 hydraulically between the reservoir and the inner end of the stop member, rather than between the return port and reservoir, is believed to greatly contribute to the improved bleedless operation of the mechanism.

The hydraulic fluid does not run out of the mechanism when a hose is disconnected from port 16 or 18 because the mechanism is not vented any other place in the system, assuming that the port not used has a plug in it, and because of the staggered relationship of passageways 24 and 26, ports 16 and 18, and orifice 52. Air is no problem in the lines leading to ports 34 and 36 because they connect merely to a simple piston motor and such motor is fully capable of operating on either air or liquid; nor is it a problem when the stop member is retracted, because the entire mechanism is then full of liquid, with no room for air. Thus, the stop mechanism of the present invention never needs bleeding, even when a hose may initially be full of air.

While it will be apparent that the preferred embodiment of the invention disclosed is well calculated to fulfill the objects above stated, it will be appreciated that the invention is susceptible to modification, variation and change without department from the proper scope or fair meaning of the subjoined claims.

What is claimed is:

1. A fluid stop mechanism comprising a stop member adapted to engage a workpiece or the like, expansible chamber motor means for moving said stop member into or out of engagement with a workpiece or the like, said motor means including a first expansible chamber; a second expansible chamber; a fluid chamber defined in said mechanism and adapted to receive a substantially incompressible fluid, an element in said fluid chamber connected for movement with said stop member for altering the volume of said fluid chamber upon movement of said stop member, fluid control means having a passageway for controlling the flow of fluid between said fluid chamber and said second expansible chamber; said fluid control means being movable between an opened position permitting flow in either direction through said passageway and a closed position wherein said passageway is moved out of communication with said fluid chamber and fluid is trapped in said fluid chamber to thereby become a locking fluid, whereby said fluid control means is moved by said motor means from its opened position to its closed position in response to engagement of said stop member with a workpiece or the like, said locking fluid within said fluid chamber thereby resisting movement of said stop member in a reverse direction, a supply and exhaust connection for said motor means, a reservoir between said connection and said second expansible chamber for the fluid flowing to and from said fluid chamber, said reservoir having a fluid capacity at least as great as the maximum operable volume of said fluid chamber, and fluid flow restricting means disposed between said connection and said second expansible chamber for creating a fluid back pressure in said second expansible chamber and said fluid chamber responsive to movement of the motor means, which pressure acts on said element to move the stop member in unison with said motor means.

2. A fluid stop mechanism comprising a housing; a stop member reciprocally mounted for longitudinal movement in said housing and adapted to engage a workpiece or the like; expansible chamber motor means in said housing for moving said stop member into or out of engagement with a workpiece or the like, said motor means including a first expansible chamber; a second expansible chamber; a fluid chamber in said housing adapted to receive a substantially incompressible fluid; an element in said fluid chamber connected for movement with said stop member for altering the volume of said fluid chamber upon movement of said stop member; fluid control means having a passageway for controlling the flow of fluid between said fluid chamber and said second expansible chamber and being movable between an opened position permitting flow in either direction through said passageway and a closed position wherein said passageway is moved out of communication with said fluid chamber and fluid is trapped in said fluid chamber to thereby become a locking fluid, said motor means being responsive to engagement of said stop member with a workpiece or the like to move said fluid control means from its opened position to its closed position upon such engagement for locking fluid within said fluid chamber to thereby resist movement of said stop member in a reverse direction; a reservoir in said housing for supplying fluid to and from said fluid chamber, said reservoir having a fluid capacity at least as great as the maximum operable volume of said fluid chamber and communication means between said reservoir and said second expansible chamber, said communication means effecting a pressure in said second expansible chamber upon movement of said motor means, whereby a pressure differential is created between said second expansible chamber and said fluid chamber so that fluid will flow into said fluid chamber.

3. A fluid stop mechanism as claimed in claim 2, wherein said communication means includes fluid flow restricting means causing said pressure differential for moving said stop member in unison with said motor means.

4. A fluid stop mechanism as claimed in claim 3, wherein said flow restricting means is an orifice of fixed area.

5. A fluid stop mechanism as claimed in claim 2, wherein said housing is generally cylindrical in shape and said reservoir is annular in shape.

6. A fluid stop mechanism as claimed in claim 2, wherein said reservoir has a volume between two times and four times said maximum operable volume.

7. A fluid stop mechanism as claimed in claim 2, wherein said reservoir has a volume greater than twice said maximum operable volume.

8. A fluid stop mechanism as claimed in claim 2, further comprising means defining inlet and outlet passageways communicating with said reservoir, said passageways being spaced longitudinally with respect to one another.

9. A fluid stop mechanism as claimed in claim 8, wherein said inlet and outlet passageways are disposed adjacent opposite longitudinal ends of said reservoir, respectively.

10. A fluid stop mechanism as claimed in claim 2, wherein said element is integral with said stop member and has a surface forming part of said fluid chamber, said surface having an effective cross-sectional area less than that of said stop member, thereby reducing the maximum volume of said fluid chamber.

11. A fluid stop mechanism as claimed in claim 2, wherein said control means includes a sleeve mounted for reciprocating movement about the outside of said element and means defining said passageway through said sleeve communicating with said fluid chamber when said control means is in said open position, said element and sleeve having a lapped seal therebetween.

* * * * *